May 8, 1962 — W. B. SEAVER — 3,033,579
SHAFT SEAL
Filed May 26, 1958 — 2 Sheets-Sheet 1

INVENTOR.
William B. Seaver
BY
Paul Fitzpatrick
ATTORNEY

May 8, 1962 W. B. SEAVER 3,033,579
SHAFT SEAL
Filed May 26, 1958 2 Sheets-Sheet 2

INVENTOR.
William B. Seaver
BY Paul Kilpatrick
ATTORNEY

United States Patent Office 3,033,579
Patented May 8, 1962

3,033,579
SHAFT SEAL
William B. Seaver, Indianapolis, Ind., assignor to General Motors Corporation, Detroit, Mich., a corporation of Delaware
Filed May 26, 1958, Ser. No. 737,900
7 Claims. (Cl. 277—91)

My invention relates to an improved seal to prevent fluid flow along a rotating shaft. The seal involves special and unusual features particularly adapting it to solve a very difficult sealing problem in a gas turbine engine of known type.

In this engine, there is a turbine which is supplied with very hot gases at a pressure of about 200 pounds to the square inch, and adjacent the turbine is a roller bearing which supports the forward end of the turbine shaft. The bearing must be lubricated, and it is necessary to keep the lubricating oil out of the turbine where it would coke and form deposits; and also necessary to keep the hot high pressure gases away from the bearing, which they would ruin.

Because of the rather high temperatures and pressures involved and the high speed of rotation of typical turbine shafts, the solution of this sealing problem has been quite difficult. In some similar installations, contact type seals have been relied upon to contain the oil, and labyrinth seals have been relied upon to contain, as well as they may, the high pressure gas. This sort of installation necessarily involves waste of motive fluid or of sealing air under pressure through the labyrinth seals to overboard vents, with substantial loss in engine efficiency.

Another factor that increases the difficulty of sealing the particular installation is the existence of quite substantial relative axial movement between the shaft and the fixed structure in which it is supported, as a result of differential thermal expansion in the engine between its condition of rest when cold and succeeding conditions as it heats up upon being started and cools upon being shut down.

In such an installation, the seal is not only adjacent the hot turbine, it is also surrounded by the combustion apparatus of the engine, with the result that high temperatures have caused carbonization of the oil to form deposits which have interfered with the movement of seals and prevented good sealing contact. The seal according to the invention is cooled by circulation of oil.

The principal object of the invention is to provide a shaft seal which operates successfully under unfavorable conditions of pressure, temperature, shaft movement, and high speed. A secondary object is to improve the efficiency and reliability of gas turbine engines.

By way of introduction to the detailed description of the invention, it may be stated that the complete seal installation in its preferred embodiment comprises a seal follower mounted on the shaft and a double seal member comprising a two part sleeve non-rotatably mounted in the supporting structure around the shaft. The two parts of the sleeve together surround the seal follower, with each carrying a carbon seal annulus for alternately engaging opposite faces of the seal follower, one carbon seal normally engaging one face of the follower under the urging of a spring. The sleeve is reciprocably mounted in the support to follow the axial shifting of the shaft and there is provided a seal of the piston-ring type between the sleeve and the support. The piston ring is chamfered on its rubbing surface so that the pressure against which the seal operates is exerted against the major part of the sealing peripheral surface of the piston ring seal to balance in large measure the pressure against the peripheral surface which is contained in the seal groove. The sealing faces of the carbon annuli are radially spaced from the shaft to cause gas pressures to act thereon to nearly balance the pressures exerted on other portions of the sleeve in the opposite direction.

The follower is supplied with lubricating oil under pressure from within the shaft and has an oil passage supplying oil to the face of the carbon seal normally urged into engagement with the follower. The other carbon seal is lubricated by splash from the bearing. The oil acts to cool these parts and normally prevents any deposits from forming thereon.

As it is possible for the piston seal to stick, particularly upon formations of carbon in the cage bore, the follower may separate from the carbon annulus normally engaged therewith when the engine is started. A feature of this invention lies in the provision of the second seal on the shaft which is normally spaced from one face of the follower but which engages it when the first seal moves away from the opposite face of the seal follower.

The nature of the invention and the advantages thereof will be clearly apparent from the subsequent detailed description of an illustrative installation of the preferred embodiment of the invention and the accompanying drawings thereof, in which.

It may be pointed out that no effort has been made to illustrate an entire gas turbine engine since it is not needed for understanding the invention and also because the invention, while particularly suited for gas turbines, is capable of employment in other types of rotating machinery.

Figure 1:
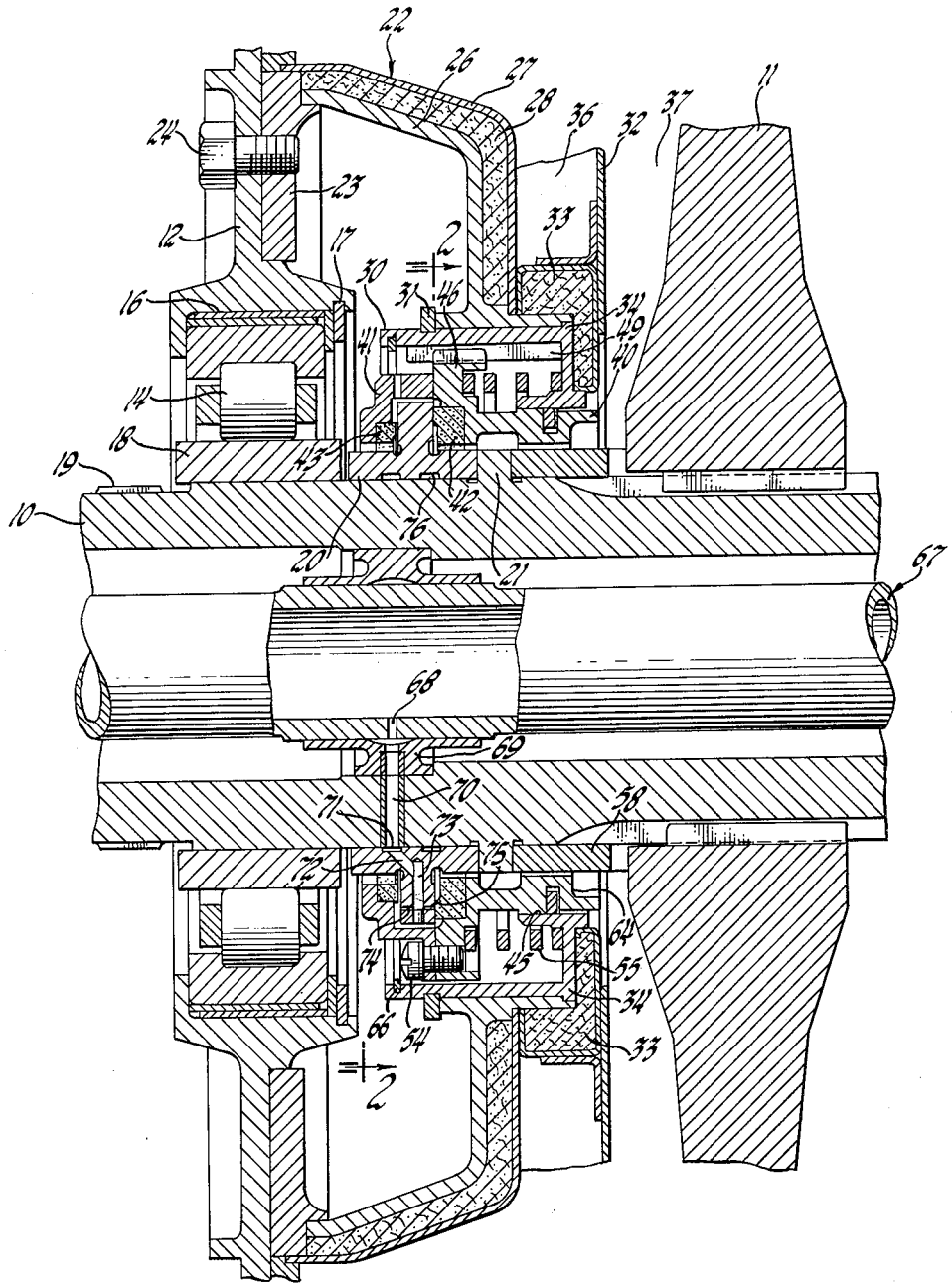
FIGURE 1 is a fragmentary sectional view of a gas turbine taken on a plane containing the axis of the turbine shaft.

The turbine illustrated fragmentarily in FIGURE 1 is of known type including a shaft 10 on which are mounted turbine wheels 11, the first wheel being shown. The turbine shaft and wheels are mounted in a casing or stator which includes a front bearing support structure 12. This support structure is flanged to receive the outer race of a roller bearing 14. A vibration damping ring 16 may be fitted between the outer race of the bearing and the support. The bearing is held between an abutment on the support and an expanding lock ring 17. The inner race 18 of the bearing 14 is held in place by a collar (not shown) splined at 19 to shaft 10 urging the inner race towards a seal follower ring 20 which in turn engages a ridge 21 on the shaft. Bearing 14 is shielded from the turbine by a sump assembly weldment 22 including an inwardly directed flange 23 fixed to the bearing support by cap screws 24. The sump assembly comprises an inner plate 26, an outer plate 27, and heat insulating material 28 between the plates. A cage or support 30 is fitted in the cylindrical central opening of the plate 26 and retained by a contracting snap ring 31.

A radial plate or heat shield 32 is mounted in front of the first turbine wheel and separated from the sump assembly 22 by a heat insulating ring 33 which abuts the rear wall 34 of the cage 30. The space 36 between the bearing sump and plate 32 and the space 37 between that plate and the turbine wheel 11 contain compressed air under a pressure of the order of 200 pounds per square inch, which slightly exceeds that of the motive fluid in the turbine; thus, the compressed air escapes from spaces 36 and 37 into the turbine. Limited quantities of compressed air are admitted to these spaces to create a slight flow into the turbine so that the combustion products in the turbine will not flow inwardly from the motive fluid annulus. This compressed air is derived from the combustion chamber jacket of the engine and is quite hot as a result of compression and, to some extent, of heating in the combustion apparatus. Hot as it is, it cools to some extent the still hotter turbine wheel 11. The bearing 14, of course, must be lubricated and, therefore, the double-seal serves the purpose of keeping the hot gas out of the bearing and bearing sump and keeping the lubricating oil from escaping into the turbine where it would be coked by the hot turbine wheel.

Figure 2:
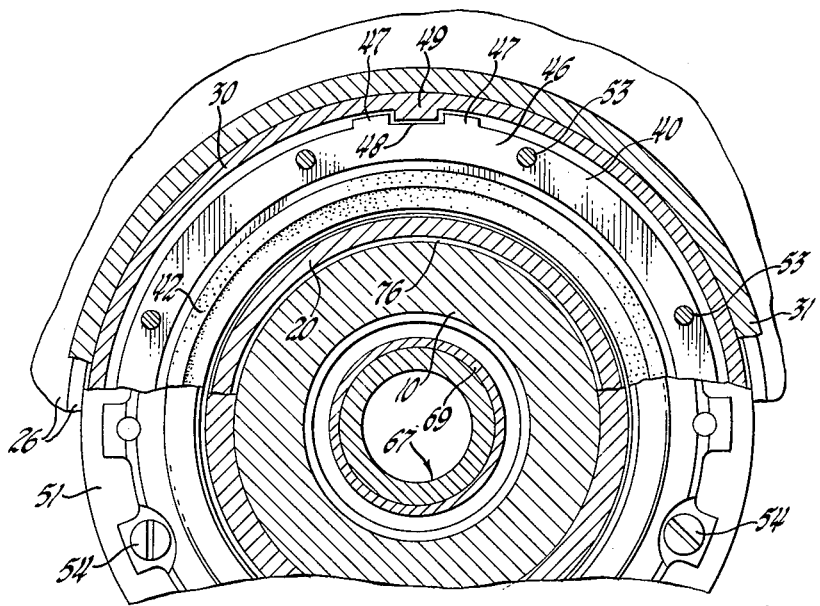
FIGURE 2 is a partial transverse sectional view of the seal assembly taken on the plane indicated by the line 2—2 in FIGURE 1 with parts broken away.

Considering now more specifically the seal structure, as distinguished from its environment, the seal comprises the follower 20 and the cage 30 previously mentioned. It also comprises first and second sleeves 40 and 41 respectively, which carry the carbon seal annuli or rings 42 and 43, annulus 43 being of a smaller diameter than annulus 42 for a purpose to be described later. These particular rings are referred to as an annulus to distinguish it from the piston ring type sealing ring 44 mounted in a groove in the outer surface of the rear end of sleeve 40. The piston ring seal bears against the inner cylindrical surface 45 of the cage 30. The sleeve 40 includes a radial annular flange 46, the periphery of which bears four projections 47 (two of which are shown in FIG. 2) with sliding clearance in the cylindrical interior of the cage 30. Notches 48 in two of these projections receive ribs 49 brazed to the interior of the cage so that the sleeve 40 is non-rotatably mounted. The sleeve 41 includes an annular flange 50 having a radial portion 51 and an axial portion 52, the axial portion 52 and the flange 46 having a number of axially aligned holes 53 bored therein and equally spaced around the circumferences of the flanges for the insertion therein of cap screws 54 securing the two sleeves together. The carbon annuli 42 and 43 are fitted in recesses in the faces of the sleeves 40 and 41. The carbon annulus 43 is of such a width or thickness that there is a slight clearance, such as .0015–.0035 of an inch, for example, between the face of the annulus and the face of the follower when the carbon annulus 42 is engaged with the opposite face of the follower 20, and conversely, there is a slight clearance between annulus 42 and the follower when annulus 43 is engaged with the follower. A coil spring 55 held between the rear wall 34 of the cage 30 and the flange 46 urges the sleeves 40 and 41 forward and thereby biases the carbon annulus 42 into engagement with the nitrided rear radial face 56 of an outwardly extending flange of the follower 20, and annulus 43 out of engagement with the front nitrided radial face 57 of the follower. The sleeves 40 and 41 and carbon annuli 42 and 43 are dimensioned for a slight running clearance, such as about 1/50 of an inch, from the rotating parts within them, which are the hub portions of the follower 20 and a spacer ring 58 impinged between the rib 21 on the shaft and the forward turbine wheel 11. It will be seen, therefore, that the seal assembly as a whole comprises a rotary contact seal between the opposite faces 56 and 57 of the follower and the faces of the carbon annulus 42 and 43, respectively, depending upon which is engaged, and comprises a sliding contact seal between the sleeve 40 and cage 30 provided by piston ring 44.

The piston ring seal 44 is of the expanding type, and because of the relatively high pressure existing to the rear of the seal; that is, in the space 37, the ring 44 is urged against the forward face 59 of the groove 60 in which it is mounted and the high pressure gas enters the space 61 within the groove under the inner periphery of the ring. This pressure urges the ring radially outward and tends to provide too great rubbing force between the piston ring and the surface 45. For this reason, therefore, the outer periphery of the seal is chamfered as indicated at 62 (FIGURE 3) so that about two-thirds to three-fourths of the outer face of the ring is relieved to permit the high pressure gas to exert an inward force over the major part of the exterior of the ring. In this way the rubbing force between the ring 44 and the bore 45 is maintained at a reasonable level to prevent undue friction at this point of sliding contact.

As will be apparent, the high gas pressure is exerted against the rear radial face of sleeve 40 between the spacer ring 58 and the bore 45 of the cage. This force would cause too heavy rubbing contact between the carbon annulus and the follower unless balanced. To prevent this, the forward face of the carbon annulus 42 is recessed as indicated at 63 for a radial distance approximately equal to the radial extent of the recess 64 in the end of the sleeve 40 so that the gas pressure is exerted over the areas of these recesses 63 to balance each other. The gas pressure on the remaining piston area at the rear face of the sleeve 40 is therefor small and prevents too great a gas pressure being exerted on annulus 42. More specifically, the gas pressure may be assumed to be exerted on an annular recessed piston extending from the inner radius of the sleeve 40 approximately to the mean radius of the rubbing part of the carbon annulus 42 to urge the sleeve 40 rearwardly. The gas pressure is also exerted against an annular recessed piston consisting of the entire rear face of the sleeve 40 and the piston ring 44 to urge the sleeve forwardly. The effective area exposed to the gas pressure in the rear is slightly greater than that at the front so that the gas pressure adds slightly to the force of spring 55 in maintaining the seal annulus in contact with the follower. It would not do to have too high a gas load on the seal, as the endurance of the seal would be reduced by excessive loading.

Figure 3:
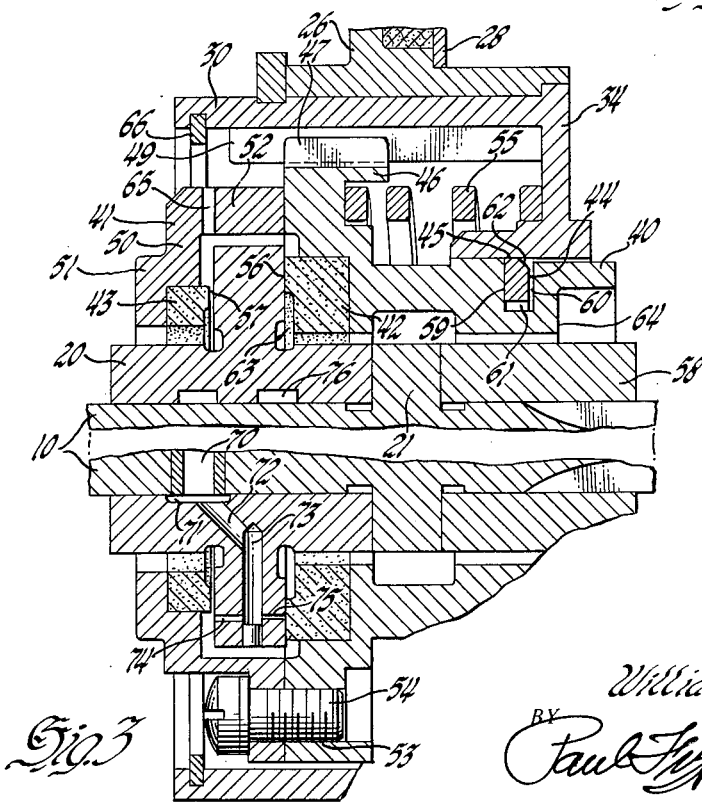
FIGURE 3 is an enlarged fragmentary sectional view taken on a vertical plane containing the shaft axis.

In addition to the action described above, in the event that shaft 10 moves forwardly with respect to sleeves 40 and 41 because of sticking of the sleeve 40 in bore 45, the pressure of the gas on sleeve 41 when gas pressure leaks past disengaged annulus 42, with annulus 43 engaged, assists in urging the sleeve 40 forwardly with respect to the cage 30. As seen in FIG. 3, the flange 46 is recessed above annulus 42 to a radial distance approximately equal to the radial extent of the fluid passage between the radial portion of sleeve 41 and the follower 20. The annulus 43 is of a smaller diameter than annulus 42 so that the effective area acted upon by gas pressure leaking past annulus 42 with annulus 43 engaged is approximately equal to the radial difference between the two annuli. The gas pressure therefore acts against the rear face of sleeve 41 to urge both sleeves and annuli forwardly to aid spring 55 to engage annulus 42 with the follower and disengage annulus 43. This added forwardly directed force is necessary because once the annulus 42 breaks contact with the follower, the pressure of the gas acts on the full face of the carbon annulus 42 to balance the full pressure of the gas on the piston end of the sleeve 40, thereby reducing the pressure force on piston 40 acting to engage annulus 42. As seen in FIGURES 1 and 3, a metered oil vent 65 is shown to relieve the passage between the sleeves and follower of any oil that might accumulate therein. Preferably, there are four small vents 65 spaced 90° apart. However, the orifices are sufficiently small that upon gas pressure leaking past the disengaged annulus 42, only a negligible pressure drop is effected.

Therefore, to repeat, since there is no longer contact of the carbon annulus 42 with the follower, there is substantially full pressure against the forward piston area of this annulus balancing the full gas pressure in space 37 against the rear piston face of sleeve 40. Thus, if the sleeves 40 and 41 tend to stick as the shaft 10 moves forward relative to the cage 30, the unbalanced gas force pressing forwardly on the sleeve 41 gradually increases, acting to break annulus 43 loose and force annulus 42 into contact with the seal follower.

An expanding snap ring 66 serves to retain the sleeve 40 in the cage in the disassembled condition of the machine. When the turbine wheel is in place and the turbine shaft is in position, the flange 46 does not engage the ring 66.

The means for lubricating and cooling the seals and turbine bearing will now be described. Lubricating oil for the turbine bearing is supplied through hollow turbine tie bolt 67 by means which are immaterial to the present invention but which may be as described in the United States Patent 2,693,248 to A. W. Gaubatz and J. B. Wheatley. The oil under pressure in the tie bolt 67 flows radially outwardly through passage 68, a passage in a spacer 69, and a radial passage 70 in the shaft into an annular groove 71 in the inner surface of the follower ring 20. This groove provides a distributing chamber by which the oil is conducted through suitable radial bores 72 and 73 to a number of axially extending ports or jets 74 and 75 which direct it against the face of the carbon annulus 42, around the carbon annulus 43 into the bearing 14 for lubrication thereof, and into the cage 30 to cool the seal and lubricate the movable parts thereof. Passage 75 is substantially at the mean radius of the contacting face portions of the carbon annulus 42 and follower.

Since there is considerable heat conducted into the area of the seal by the turbine wheel and turbine shaft a substantial quantity of oil is discharged into the seal cage to keep the parts below a temperature which deposition of solid matter from the oil occurs. This cooling oil is kept out of the turbine by seals 42 and 44.

In order to prevent any seepage of oil from chamber 71 between the follower 20 and flange 21 of the shaft, which oil could then escape into the turbine, a second groove 76 is provided in the interior of the follower to the rear of groove 71. Groove 76 drains through four circumferentially spaced drilled vents (not shown). Any compressed air leaking along the inside of follower 20 from within the sleeve 40 would escape through these vents.

Considering now the operation of the seal in general, it should be pointed out that the relative position of the parts shown in FIGURE 1 is that obtained when the engine is cold, with seal annulus 42 engaged with the follower and annulus 43 disengaged. The shaft 10 is coupled to the stationary structure of the engine through a thrust bearing forward of roller bearing 14. When the engine is started, the stationary structure immediately becomes quite hot and expands so that the bearing support 12 moves rearwardly relatively to the shaft. In other words, the cage 30 moves rearwardly with respect to follower 20. The spring 55 and the slight unbalance of air pressure on sleeve 40 should move the sleeve forwardly relative to the cage to maintain the rotary seal 42 in engagement; however, there is some possibility of undue friction after the engine has been standing, so that it is possible for the seal 42 to be carried rearwardly away from the follower. If this happens, however, upon the slightest movement thereof, the annulus 43 will engage the follower creating an unbalance of air pressure between the rear face portion of sleeve 41 and the follower as previously described, to move the sleeves forward and close the gap between carbon annulus 42 and the follower face 56, with carbon annulus 43 moving out of contact with follower face 57. If the unbalance of pressure does not suffice at this time, seal 43 will be engaged with face 57 of the follower to prevent leakage of the hot gas to the bearing until such time as carbon annulus 42 again is in contact with face 56 of the follower. The total initial movement upon starting at the bearing 14 in a particular case may be ⅛ of an inch. After the engine is run for a few moments, the shaft, which heats more slowly than the stationary combustion structure, expands to some extent and thus there is a slight reversal of the relative expansion. In other words, the shaft moves backwardly relatively to the shaft structure. The total expansion of the shaft, however, is less than that of the case. This last movement is accommodated by compression of spring 55. Under engine operation conditions, relative expansion of the stator and rotor draws the shaft forward so that flange 58 enters the rear end of bore 45 of the cage, in which it rotates with slight clearance.

In case of failure of both of the seals 42 and 43, parts 58 and 45 will serve as a labyrinth seal of rather limited efficiency. Upon shutting the engine down, the stationary and rotating parts cool and the casing shifts forwardly relative to the shaft to the position illustrated in FIGURE 1.

The oil film maintained between the rubbing surfaces of the rotating seal 42 by the jet 75 minimizes frictional heating and wear, providing long life for the seal. The cooling jet injected into the cage keeps the seals at a livable temperature. The presence of a satisfactory sliding contact seal is also essential to proper operation of the seal assembly. In view of the ambient temperatures, rubber-like materials which would otherwise be very desirable for this purpose are not usable and, therefore, resort is had to the piston ring type seal, and in this connection the chamfering of the sealing peripheral surface of the ring 42 has been found most beneficial in reducing friction in the sliding seal.

It will be seen from the foregoing that the combination of a number of features distinguish this double seal from ordinary rotating contact seals. These features have produced a highly successful solution to very difficult sealing problem. The particular utility of the seal of the invention for the gas turbine as described will, of course, be apparent, but it will also be clear to those skilled in the art that this seal is suitable for many fluid sealing applications.

The detailed description of the preferred embodiment of the invention for the purpose of explaining the principles thereof is not to be construed as limiting the scope of the invention, as many modifications may be made by the use of skill in the art within the bounds of the invention.

I claim:

1. A fluid seal of the sliding contact type comprising a shaft, a seal follower mounted on said shaft having opposed contact faces separated by the thickness of said follower, a sleeve surrounding said follower and a portion of said shaft, said sleeve being mounted for slidable movement with respect to said follower, said sleeve being radially spaced from said shaft and follower to define a fluid passage therebetween, a plurality of seal annuli including a first face contact seal annulus carried by said sleeve having its face engaging one of the faces of said follower, means biasing said latter faces into engagement, and a second face contact seal annulus carried by said sleeve positioned adjacent the opposed face of said follower and connected to said first seal annulus by said sleeve for movement as a unit, the axial distance between said seal annuli being greater than the thickness of said follower, movement of said sleeve relative to said shaft and follower in one direction disengaging said first seal annulus from said follower while engaging said second seal annulus against said opposed face of said follower preventing the passage of fluid therethrough leaking past said first disengaged seal annulus.

2. A fluid seal of the sliding contact type comprising a rotatable shaft having a seal follower mounted thereon, said follower having opposed contact faces separated by the thickness of said follower, a sleeve surrounding said follower and a portion of said shaft, said sleeve being mounted for a sliding movement relative to said shaft and being spaced radially therefrom, said radial spacing providing a fluid passage between said sleeve and said shaft and said follower, a plurality of seal annuli including a first face contact seal annulus carried by said sleeve having one face adapted to engage a face of said follower, a second face contact seal annulus carried by said sleeve adapted to engage the opposed face of said follower and connected to said first seal annulus by said sleeve for movement as a unit, said second seal annulus being normally disengaged from said opposed face, one end of said fluid passage being in communication with fluid under pressure, means normally biasing said first seal annulus into engagement with said one face of said follower for preventing the flow of fluid under pressure past said first seal annulus, the axial distance between said seal annuli being greater than the thickness of said follower, movement of said sleeve relative to said shaft and follower disengaging said first seal annulus with said one face while engaging the face of said second seal annulus with said opposed face of said follower preventing the flow of liquid under pressure through said passage past said second seal annulus.

3. A fluid seal as in claim 2, wherein said second seal annulus is of a smaller diameter than said first seal annulus, the portion of said sleeve surrounding said follower adjacent said second seal annulus being subjected to the pressure of the fluid in said passage when said second seal annulus is engaged with said follower to bias said first seal annulus into engaging position.

4. A fluid seal as in claim 2, wherein said first seal annulus is of a larger diameter than said second seal annulus, the sleeve having a radial portion extending a radial distance substantially equal to the difference in diameters of said annuli, said radial portion being subjected to the pressure of fluid leaking past said disengaged first annulus when said second annulus is engaged with said opposed face to bias said first annulus into engagement with said follower.

5. A fluid seal of the sliding contact type comprising a rotatable shaft having a seal follower secured thereto for rotation therewith, a first sleeve slidably mounted with respect to said shaft and enclosing portions of said shaft and follower, a second sleeve slidably mounted with respect to said shaft and cooperating with said first sleeve to enclose said follower, means connecting said sleeves, said sleeves being radially spaced from said shaft and said follower to provide a fluid passage therebetween, said follower having opposed contact faces, a plurality of seal annuli including a first face contact seal annulus carried by said first sleeve having a face adapted to engage one face of said follower, a second face contact seal annulus of smaller diameter than said first carried by said second sleeve and having a face positioned adjacent the opposed face of said follower for engagement at times therewith, means normally biasing said first seal annulus into engagement with said one face of said follower and said second annulus out of engagement with said opposed face, one end of said sleeve being subjected to fluid under pressure, the axial distance between said seal annuli being greater than the thickness of said follower, movement of said sleeves relative to said follower against the action of said biasing means disengaging said first annulus with respect to said follower while engaging said second annulus therewith preventing the passage of fluid past said second annulus, the opposed face of said follower having a radial portion extending a distance substantially equal to the difference in radial distances between said first and second seal annuli, said second sleeve having a radial portion parallel to said radial portion of said follower, the engagement of said second seal annulus with the opposed face of said follower subjecting said radial portion of said second sleeve to the pressure of fluid leaking past said first annulus to aid said biasing means to engage said first annulus with said one face and disengage said second annulus with said opposed face.

6. A fluid seal of the sliding contact type comprising a rotatable shaft having a seal follower secured thereto for rotation therewith, said follower having a portion extending radially from said shaft, said portion having opposed axially aligned contact faces, a sleeve slidably mounted with respect to said follower and said shaft enclosing said follower and a portion of said shaft and being radially spaced therefrom, said radial spacing defining a fluid passage between said sleeve, follower and portion of said shaft, means restraining rotation of said sleeve, one end of said sleeve being in communication with fluid under pressure, and seal means carried by said sleeve preventing the passage of fluid through said passage to the other end of said sleeve, said means comprising a plurality of face contact seal annuli carried by said sleeve on opposite sides of said follower for alternate engagement with the opposed faces of said follower, the axial distance between said seal annuli being greater than the thickness of said follower, means biasing said sleeve in one direction for engaging the seal means on one side of said follower with one face of said follower preventing the flow of fluid therebetween, movement of said sleeve in the opposite direction seating said seal means on the opposite side of said follower with the opposed face of said follower preventing the flow of fluid to the other end of said sleeve leaking past said oppositely disposed seal means, one end of said sleeve having a portion acted upon by the fluid under pressure in a direction to aid said biasing means, said sleeve having a radial portion subjected to the force of the fluid under pressure in a direction to additionally aid said biasing means upon the engagement of said seal means on the opposite side of said follower with the opposed face of said follower.

7. A fluid seal of the sliding contact type comprising a seal follower having a number of axially separated faces, a plurality of movable axially separated contact seals including one seal adjacent each of said faces, means connecting said seals for movement as a unit, and means biasing one of said seals into contact with one of said faces while biasing another of said seals out of contact with another of said faces, the axial distance between said seals being greater than the axial distance between said faces and of such an extent that movement of said one seal out of contact with said one face effects contact of said another of said seals with said another of said faces to seal said last mentioned another of said faces against the flow of any fluid therepast.

References Cited in the file of this patent

UNITED STATES PATENTS

| | | |
|---|---|---|
| 1,187,212 | Westinghouse | June 13, 1916 |
| 1,683,756 | Blache | Sept. 11, 1928 |
| 2,007,414 | Weis et al | July 9, 1935 |
| 2,479,265 | Roshong | Aug. 16, 1949 |
| 2,814,511 | Truax | Nov. 26, 1957 |
| 2,857,182 | Bain et al. | Oct. 21, 1958 |

FOREIGN PATENTS

| | | |
|---|---|---|
| 714,377 | Germany | Nov. 28, 1941 |

UNITED STATES PATENT OFFICE
CERTIFICATE OF CORRECTION

Patent No. 3,033,579 May 8, 1962

William B. Seaver

It is hereby certified that error appears in the above numbered patent requiring correction and that the said Letters Patent should read as corrected below.

Column 6, line 23, after "to" insert -- a --; column 7, line 9, for "liquid" read -- fluid --.

Signed and sealed this 11th day of September 1962.

(SEAL)
Attest:

ERNEST W. SWIDER
Attesting Officer

DAVID L. LADD
Commissioner of Patents